United States Patent
Umehara

(10) Patent No.: US 10,145,596 B2
(45) Date of Patent: Dec. 4, 2018

(54) OUTDOOR DEVICE AND AIR CONDITIONER

(71) Applicant: Mitsubishi Electric Corporation, Tokyo (JP)

(72) Inventor: Shigeo Umehara, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 455 days.

(21) Appl. No.: 14/845,330

(22) Filed: Sep. 4, 2015

(65) Prior Publication Data

US 2016/0091235 A1    Mar. 31, 2016

(30) Foreign Application Priority Data

Sep. 26, 2014 (JP) ................................. 2014-196963

(51) Int. Cl.
*F24F 11/30* (2018.01)
*F25B 49/02* (2006.01)
(Continued)

(52) U.S. Cl.
CPC .............. *F25B 49/02* (2013.01); *F24F 1/24* (2013.01); *F24F 1/40* (2013.01); *F24F 11/30* (2018.01);
(Continued)

(58) Field of Classification Search
CPC .............. F25B 49/02; F24F 11/30; F24F 1/24
See application file for complete search history.

(56) References Cited

U.S. PATENT DOCUMENTS

| 4,090,664 A | * | 5/1978 | Elderkin | ................. F23N 5/143 236/11 |
| 4,488,823 A | * | 12/1984 | Baker | ..................... F25B 49/02 374/170 |

(Continued)

FOREIGN PATENT DOCUMENTS

| JP | 64-041752 A | 2/1989 |
| JP | 06-265199 A | 9/1994 |

(Continued)

OTHER PUBLICATIONS

Extended European Search Report dated Mar. 21, 2016 in the corresponding EP application No. 15183985.9.

(Continued)

*Primary Examiner* — Ljiljana Ciric
*Assistant Examiner* — Alexis Cox
(74) *Attorney, Agent, or Firm* — Posz Law Group, PLC

(57) ABSTRACT

An outdoor device of an air conditioner includes a compressor, an outdoor fan, and an outdoor control board. The outdoor device includes: a control unit that controls the compressor and the outdoor fan; and a temperature detector that detects an ambient temperature of an electric component provided on the outdoor control board. The control unit, when the compressor is stopped, stops the outdoor fan and then determines whether a temperature detected by the temperature detector is equal to or higher than a threshold, and, when it is determined that the temperature detected by the temperature detector is equal to or higher than the threshold, operates the outdoor fan at a protective rotation number that is lower than a rotation number of the outdoor fan while the compressor is in operation so as to circulate air, thereby cooling the outdoor control board.

10 Claims, 10 Drawing Sheets

(51) Int. Cl.
*F24F 1/24* (2011.01)
*F24F 1/40* (2011.01)
*F25B 13/00* (2006.01)
*F24F 11/77* (2018.01)
*F24F 110/10* (2018.01)

(52) U.S. Cl.
CPC .............. *F24F 11/77* (2018.01); *F25B 13/00* (2013.01); *F24F 2110/10* (2018.01)

(56) References Cited

U.S. PATENT DOCUMENTS

| | | | | |
|---|---|---|---|---|
| 4,557,317 | A * | 12/1985 | Harmon, Jr. | G05D 23/1902 165/201 |
| 5,074,120 | A * | 12/1991 | Kitamoto | F24F 11/08 62/156 |
| 5,239,834 | A * | 8/1993 | Travers | F25D 16/00 165/248 |
| 9,781,864 | B2 * | 10/2017 | Yamaguchi | H05K 7/20736 |
| 9,825,615 | B2 * | 11/2017 | Schneider | H03K 3/01 |
| 2001/0024615 | A1 * | 9/2001 | Chen | F04D 27/004 417/32 |
| 2002/0175597 | A1 * | 11/2002 | Raman | F04D 33/00 310/328 |
| 2003/0084673 | A1 * | 5/2003 | Moon | F25B 49/027 62/184 |
| 2004/0204874 | A1 * | 10/2004 | Hasuka | B60L 11/1881 702/60 |
| 2007/0026278 | A1 * | 2/2007 | Wake | H01M 8/04156 429/429 |
| 2007/0227721 | A1 * | 10/2007 | Springer | G05D 23/1931 165/291 |
| 2008/0266811 | A1 * | 10/2008 | Yamada | F24F 1/12 361/720 |
| 2010/0246083 | A1 * | 9/2010 | Shibuya | B60H 1/3225 361/93.8 |
| 2011/0075354 | A1 * | 3/2011 | Yuan | G06F 1/206 361/679.48 |
| 2012/0307540 | A1 * | 12/2012 | Tagome | H02M 1/088 363/131 |
| 2014/0286069 | A1 * | 9/2014 | Shinomoto | H02M 1/08 363/131 |
| 2016/0226425 | A1 * | 8/2016 | Kawashima | H02P 27/04 |
| 2017/0098932 | A1 * | 4/2017 | Ellwein | H02K 11/20 |
| 2017/0229241 | A1 * | 8/2017 | Goodson | H02H 9/04 |
| 2017/0229242 | A1 * | 8/2017 | Goodson | H02H 9/005 |

FOREIGN PATENT DOCUMENTS

| | | |
|---|---|---|
| JP | 3089890 B2 | 10/1994 |
| JP | 3455386 B2 | 8/1998 |
| JP | 2000-046377 A | 2/2000 |
| JP | 2000-241004 A | 9/2000 |
| JP | 2001-091024 A | 4/2001 |
| JP | 2002-327951 A | 11/2002 |
| JP | 3807353 B2 | 2/2004 |
| JP | 2005-180800 A | 7/2005 |
| JP | 2009-109113 A | 5/2009 |
| JP | 2010-271015 A | 12/2010 |
| JP | 2013-096642 A | 5/2013 |
| JP | 2013-122358 A | 6/2013 |
| JP | 2014-074567 A | 4/2014 |

OTHER PUBLICATIONS

Office Action dated Nov. 6, 2017 issued in corresponding CN application No. 201510598300.9 (and partial English translation).
Office Action dated Jun. 27, 2017 issued in corresponding JP application No. 2014-196963 (and English translation).
Office Action dated Apr. 20, 2018 issued in corresponding CN patent application No. 201510598300.9 (and English translation).

\* cited by examiner

OUTDOOR DEVICE AND AIR CONDITIONER

BACKGROUND OF THE INVENTION

1. Field of the Invention

The present invention relates to an outdoor device including an outdoor fan and an air conditioner including the outdoor device.

2. Description of the Related Art

With a conventional air conditioner, when its operation is stopped, the fan in its outdoor device continues to be driven by the air conditioner for a certain time period in order to cool the electric components; and when the temperature of the electric components is equal to or lower than a set temperature, the outdoor fan's rotation is slowed or stopped. This causes the electric components to be cooled with low noise after the air conditioner's operation has stopped. For example, see Japanese Patent Application Laid-open No. H6-265199.

The conventional air conditioner described above is configured such that after the air conditioner stops operating, the outdoor fan is kept operating for a certain time period, and when the temperature of the electric components becomes equal to or lower than the set temperature, the outdoor fan's rotation is slowed or stopped. However, the temperature of the electric components changes differently depending on whether the outdoor fan is operating or not. Therefore, even when the temperature of the electric components is equal to or lower than the set temperature, sometimes the outdoor fan still needs to be kept operating.

Given that an air conditioner includes both high-heat resistant electric components with an allowable temperature above 150° C., such as a wide-bandgap semiconductor or a reactor, and low-heat resistant electric components with an allowable temperature equal to or lower than 85° C., such as an electrolytic capacitor, then while the outdoor fan is operating, air is circulating therein so that heat is not easily transmitted from the high-heat resistant electric components to the low-heat resistant electric components. However, when the outdoor fan stops, the circulation of air stops, which causes heat to be transmitted from the high-heat resistant electric components to the low-heat resistant electric components. Accordingly, the temperature of the low-heat resistant electric components may exceed their respective allowable temperature.

However, if the operation of the outdoor fan continues for a certain time period after the operation of the air conditioner stops, power is still consumed even though the air conditioner itself has stopped operating.

SUMMARY OF THE INVENTION

It is an object of the present invention to at least partially solve the problems in the conventional technology.

According to an aspect of the present invention, an outdoor device of an air conditioner includes a compressor, an outdoor fan, and an outdoor control board. The outdoor device includes: a control unit that controls the compressor and the outdoor fan; and a temperature detector that detects an ambient temperature of an electric component provided on the outdoor control board. The control unit, when the compressor is stopped, stops the outdoor fan and then determines whether a temperature detected by the temperature detector is equal to or higher than a threshold, and, when it is determined that the temperature detected by the temperature detector is equal to or higher than the threshold, operates the outdoor fan at a protective rotation number that is lower than a rotation number of the outdoor fan while the compressor is in operation so as to circulate air, thereby cooling the outdoor control board.

According to another aspect of the present invention, an outdoor device of an air conditioner includes a compressor, an outdoor fan, and an outdoor control board. The outdoor device includes: a control unit that controls the compressor and the outdoor fan; and a temperature detector that detects a temperature of the outdoor control board. The control unit, when the compressor is stopped, stops the outdoor fan and then determines whether a temperature detected by the temperature detector is equal to or higher than a threshold, and, when it is determined that the temperature detected by the temperature detector is equal to or higher than a threshold, operates the outdoor fan at a protective rotation number that is lower than a rotation number of the outdoor fan while the compressor is operated so as to circulate air, thereby cooling the outdoor control board.

According to still another aspect of the present invention, an air conditioner includes: the outdoor device described above; and an indoor device that is connected to the outdoor device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an outdoor device and an air conditioner according to the present invention will be explained below in detail with reference to the accompanying drawings. The present invention is not limited to the embodiments.

First Embodiment

Figure 1:
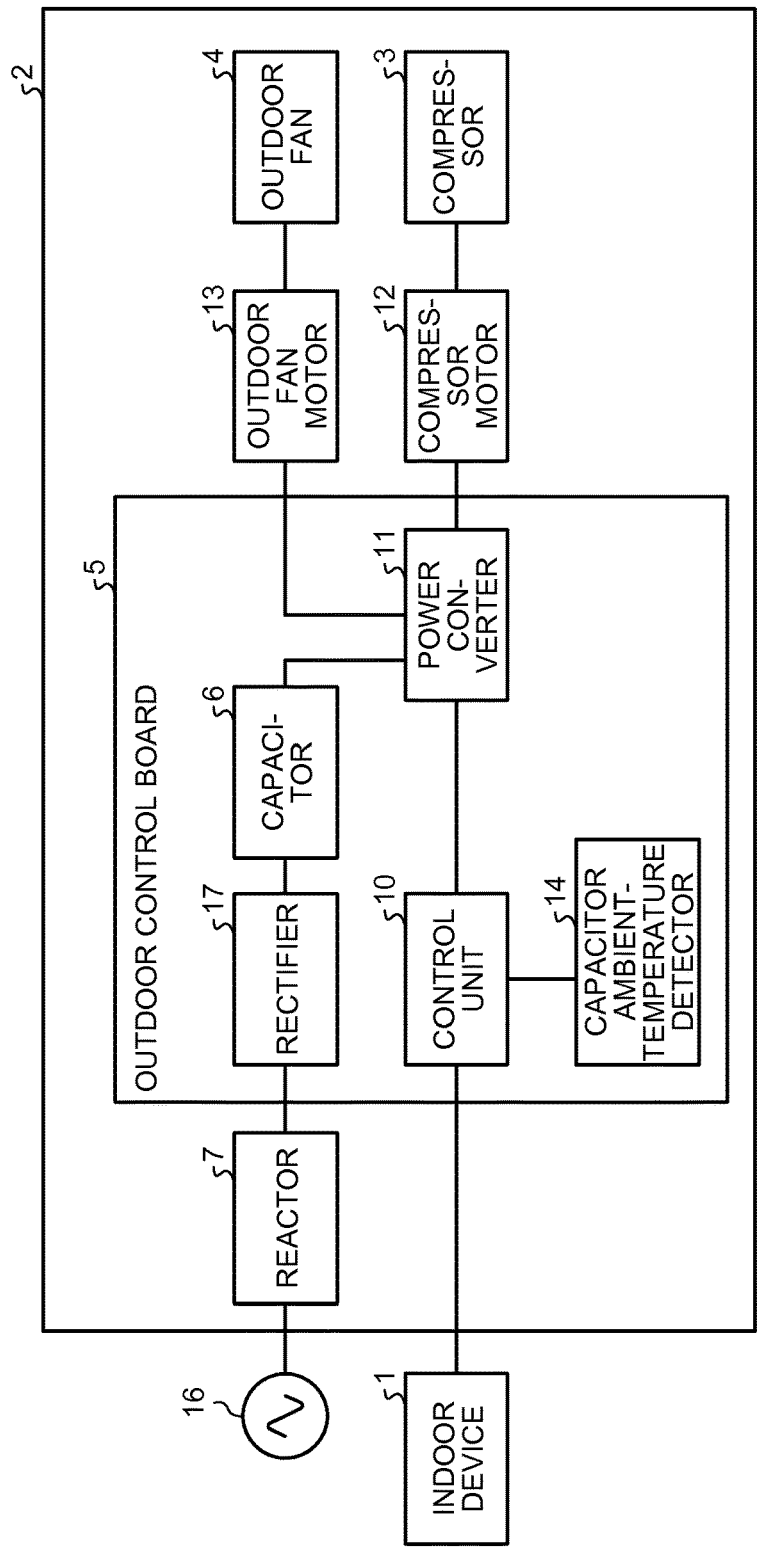
FIG. 1 is a diagram illustrating an example configuration of an air conditioner according to a first embodiment of the present invention.

FIG. 1 is a diagram illustrating an example configuration of an air conditioner according to a first embodiment of the present invention. As illustrated in FIG. 1, the air conditioner according to the first embodiment includes an indoor device 1 that is disposed in a space to be air-conditioned and an outdoor device 2 that is disposed outside the space to be air-conditioned. The indoor device 1 and the outdoor device 2 are connected to each other via a refrigerant pipe, a power line, and a communication line.

As illustrated in FIG. 1, the outdoor device 2 connects to an AC power supply 16 and includes a compressor 3, an outdoor fan 4, an outdoor control board 5 that controls the compressor 3 and the outdoor fan 4, a compressor motor 12 provided inside the compressor 3, an outdoor fan motor 13 that connects to the outdoor fan 4 to drive the outdoor fan 4, and an electronic reactor 7 that is connected between the AC power supply 16 and the outdoor control board 5 to reduce a high-frequency current. While the compressor motor 12 is provided in the compressor 3, the compressor motor 12 is illustrated as a separate constituent element in FIG. 1. Although the reactor 7 is provided between the AC power supply 16 and a rectifier 17 in FIG. 1, the reactor 7 can be alternatively provided between the rectifier 17 and a capacitor 6. In FIG. 1, the following are provided on the outdoor control board 5: the rectifier 17 that rectifies an AC voltage supplied from the AC power supply 16 into a DC voltage; a power converter 11 that converts the DC voltage to a three-phase AC voltage and that applies the AC voltage to the outdoor fan motor 13 and the compressor motor 12; the capacitor 6 that smoothes the rectified DC voltage; a capacitor ambient-temperature detector 14 that is a temperature detector that detects the ambient temperature of the capacitor 6; and a control unit 10 that controls the power converter 11 and thereby controls the outdoor fan motor 13 and the compressor motor 12. The power converter 11 includes switching elements formed from a wide-bandgap semiconductor or the like. The wide-bandgap semiconductor has a high withstand voltage and a high allowable current density so that the switching elements can be downsized, which enables the semiconductor module with the switching elements therein to be downsized. Further, the wide-bandgap semiconductor also has a high heat resistance, which enables radiation fins for a heat sink to be downsized and enables the replacement of water-cooled parts with air-cooled parts, thus further achieving downsizing of the semiconductor module. Furthermore, the low power loss of the wide-bandgap semiconductor enhances the efficiency of the elements, which leads to the semiconductor module having a high efficiency. Examples of the wide-bandgap semiconductor include silicon carbide, a gallium nitride-based material, and diamond. FIG. 1 omits any illustration of a structure such as a casing. FIG. 1 illustrates the control unit 10 as part of the outdoor control board 5.

Figure 2:
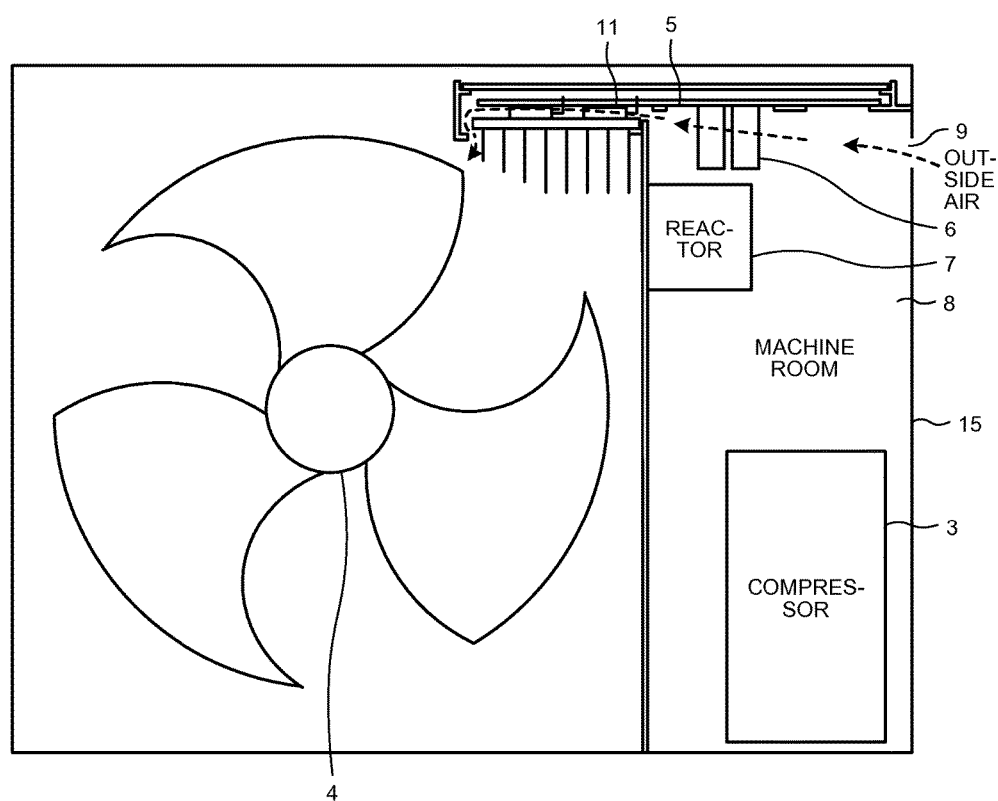
FIG. 2 is a conceptual diagram illustrating an example of a cross section of the air conditioner's outdoor device according to the first embodiment.

FIG. 2 is a conceptual diagram illustrating an example of a cross section of the outdoor device 2 of the air conditioner according to the first embodiment. FIG. 2 illustrates an example of the placement of respective constituent elements of the outdoor device 2 but does not illustrate the actual sizes of the respective constituent elements. FIG. 2 illustrates the respective constituent elements appropriately reduced or enlarged. As illustrated in FIG. 2, the outdoor device 2 includes the compressor 3, the outdoor control board 5, the capacitor 6 and the power converter 11, which are provided on the outdoor control board 5, and the reactor 7 as illustrated in FIG. 1. FIG. 2 illustrates some of the constituent elements illustrated in FIG. 1. As illustrated in FIG. 2, the outdoor device 2 further includes a casing 15 for the outdoor device 2, a machine room 8 that is a space where the compressor 3 and the like are placed, and a suction and discharge mechanism 9 that is provided in the casing 15 and that serves as a suction port or the like to take outside air into the machine room 8 by the rotation of the outdoor fan 4 when the outdoor fan 4 rotates. Although not illustrated in FIG. 2, a discharge port or the like to discharge air inside the outdoor device 2 is provided to the casing 15.

According to the first embodiment, the air conditioner has three operation modes for the outdoor fan 4, which are a stop mode in which the outdoor fan 4 is stopped; a normal operation mode in which the air conditioner is normally operated; and a protective operation mode in which a protective operation is performed to circulate air by using the outdoor fan 4 to cool components provided on the outdoor control board 5. Hereinafter, the operation mode for the outdoor fan 4 is referred to as the "fan operation mode". The three operation modes described above are the operation modes in which the outdoor fan 4 operates independently; and the outdoor fan 4 can operate not only in the normal operation mode but also in the stop mode even when the air conditioner is operating in the normal mode.

During the normal operation of the air conditioner, the control unit 10 controls the operations of the outdoor fan motor 13 and the compressor motor 12 via the power converter 11. That means that during the normal operation of the air conditioner, the control unit 10 operates the compressor 3 and the outdoor fan 4. The control unit 10 can use any control method for the outdoor fan motor 13 and the compressor motor 12 during the normal operation of the air conditioner and the control method can be any control method in the known art. Therefore, detailed descriptions of the operation of the air conditioner in the normal operation mode are omitted.

In the protective operation mode, while the operation of the compressor 3 is stopped, the outdoor fan 4 is operated to take outside air into the machine room 8 from the suction and discharge mechanism 9 to cool the components provided on the outdoor control board 5 in the machine room 8. Hereinafter, the number of revolutions of the outdoor fan 4 in the normal operation mode is referred to as the "normal revolution number", and the number of revolutions of the outdoor fan 4 on the protective operation mode is referred to as the "protective revolution number". The protective revolution number is described later.

According to the first embodiment, the control unit 10 manages the fan operation mode by using a flag of the fan operation mode to represent the fan operation mode. For example, the operation mode flag of "0" indicates the stop mode, the fan operation mode flag of "1" indicates the normal operation mode, and the fan operation mode flag of "2" indicates the protective operation mode. Note that the initial value of the fan operation mode flag is set to "0". The correspondence between the values of the fan operation mode flag and the modes is not limited to this example.

The indoor device 1 receives a user's instruction to start or to end the normal operation mode, i.e., to start or end the operation of the air conditioner from a remote controller or an input unit (both not illustrated) of the main unit of the indoor device 1. Next, the indoor device 1 transmits a signal indicating to start or to end the operation of the air conditioner to the outdoor device 2 according to the received instruction. The control unit 10 of the outdoor device 2 receives the signal instructing that the operation of the air conditioner be stopped or started from the indoor device 1. Upon reception of the signal indicating the start of the operation of the air conditioner from the indoor device 1, the control unit 10 starts controlling the compressor 3. During the normal operation of the air conditioner, the control unit 10 executes control such that the compressor 3 is operated or stopped according to the status of the enclosed location where the indoor device 1 is installed.

Figure 3:
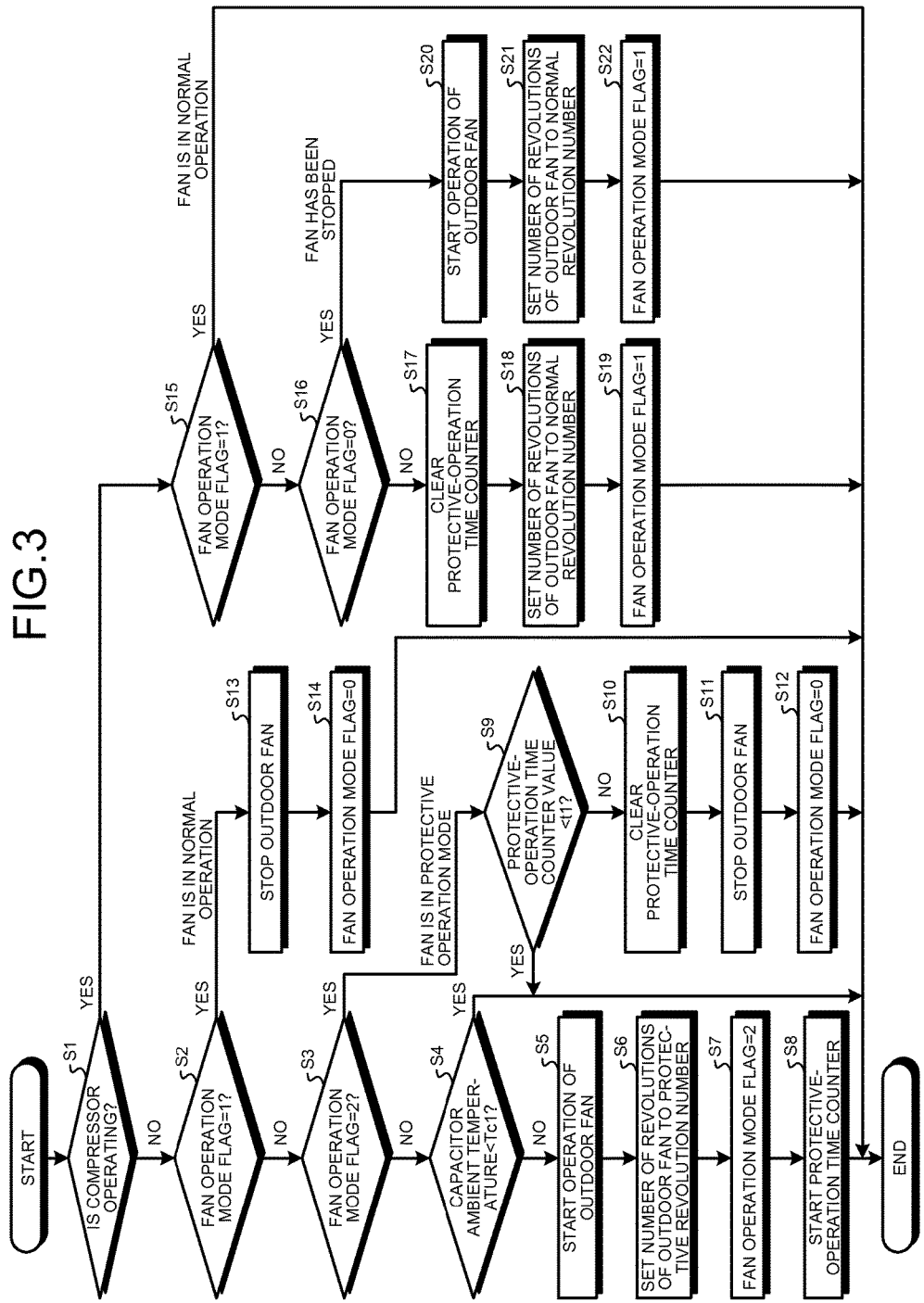
FIG. 3 is a flowchart illustrating an example of a control procedure on the air conditioner's outdoor fan according to the first embodiment.

FIG. 3 is a flowchart illustrating an example of a control procedure for the outdoor fan 4 of the air conditioner according to the first embodiment. The control unit 10 includes a protective-operation time counter for counting the time while the outdoor fan 4 is in protective operation, but the protective-operation time counter is stopped during an initial status.

The control unit 10 performs the operation illustrated in FIG. 3 in a certain period after being switched on and continues until the control unit 10 is switched off. First, the control unit 10 determines whether the compressor 3 is on operation (Step S1), and when the compressor 3 is not operating (NO at Step S1), it determines whether the fan operation mode flag is "1" (Step S2).

When the fan operation mode flag is not "1" (NO at Step S2), which means the outdoor fan 4 is in the stop mode or the protective operation mode, then the control unit 10 determines whether the fan operation mode flag is "2" (Step S3). When the fan operation mode flag is not "2" (NO at Step S3), the control unit 10 acquires the ambient temperature of the capacitor 6 detected by the capacitor ambient-temperature detector 14 and determines whether the ambient temperature of the capacitor 6 is less than a preset threshold Tc1 (Step S4). When it is determined at Step S4 that the ambient temperature of the capacitor 6 is less than Tc1 (YES at Step S4), the control unit 10 ends the process.

Tc1 can be a rated temperature of the capacitor 6, i.e., the maximum value of an allowable temperature range as a rating, or it can be set to a temperature that is lower than the rated temperature that takes the life of the capacitor 6 into account. Further, when there is an electric component that has a lower allowable temperature other than the capacitor 6 on the outdoor control board 5, Tc1 can be determined on the basis of the lower allowable temperature of the electric component than on that of the capacitor 6. When the temperature of the capacitor 6 becomes higher, the life of the capacitor 6 becomes shorter. Therefore, by keeping the temperature of the capacitor 6 lower than the maximum value of the allowable temperature range, the capacitor 6 can be replaced less frequently so as to achieve a cost reduction in consideration of the capacitor 6.

When it is determined at Step S4 that the ambient temperature of the capacitor 6 is equal to or higher than Tc1 (NO at Step S4), the control unit 10 starts the operation of the outdoor fan 4 (Step S5) and sets the number of revolutions of the outdoor fan 4 at the protective revolution number, which is the number of revolutions in the protective operation mode (Step S6). Next, the control unit 10 sets the fan operation mode flag to "2" (Step S7), starts counting the protective operation time using the protective-operation time counter (Step S8), and ends the process. The protective operation time represents a duration time of the protective operation mode.

When it is determined at Step S3 that the fan operation mode flag is "2" (YES at Step S3), which means the outdoor fan 4 is in the protective operation mode, the process proceeds to Step S9. At Step S9, the control unit 10 determines whether a protective-operation time counter value, which is a counter value of the protective-operation time counter, is less than a threshold t1 (Step S9).

When it is determined that the protective-operation time counter value is less than t1 (YES at Step S9), the control unit 10 ends the process. When it is determined that the protective-operation time counter value is equal to or larger than t1 (NO at Step S9), the control unit 10 clears the protective-operation time counter (Step S10). Further, the control unit 10 stops the outdoor fan 4 (Step S11), sets the fan operation mode flag to "0" (Step S12), and then ends the process.

When it is determined at Step S2 that the fan operation mode flag is "1" (YES at Step S2), the control unit 10 stops the outdoor fan 4 (Step S13), sets the fan operation mode flag to "0" (Step S14), and then ends the process.

When it is determined at Step S1 that the compressor 3 is operating (YES at Step S1), the control unit 10 determines whether the fan operation mode flag is "1" (Step S15). When it is determined that the fan operation mode flag is not "1" (NO at Step S15), the control unit 10 determines whether the fan operation mode flag is "0" (Step S16). When it is determined that the fan operation mode flag is not "0" (NO at Step S16), the control unit 10 clears the protective-operation time counter (Step S17). Further, the control unit 10 sets the number of revolutions of the outdoor fan 4 to the normal revolution number (Step S18), sets the fan operation mode flag to "1" (Step S19), and then ends the process.

When it is determined at Step S15 that the fan operation mode flag is "1" (YES at Step S15), the control unit 10 ends the process. When it is determined at Step S16 that the fan operation mode flag is "0" (YES at Step S16), the control unit 10 starts the operation of the outdoor fan 4 (Step S20). Next, the control unit 10 sets the number of revolutions of the outdoor fan 4 to the normal revolution number (Step S21), sets the fan operation mode flag to "1" (Step S22), and then ends the process. As described above, the above process is performed in a certain period.

According to the first embodiment, the initial value of the fan operation mode flag is "0", and when the operation of the compressor 3 starts, the process proceeds through Step S1, Step S15 and Step S16, and then through Steps S20 to S22 so that the outdoor fan 4 is operated at the normal revolution number and the fan operation mode flag is set to "1". When the operation of the compressor 3 stops thereafter, the process proceeds through Step S1, Step S2, Step S13, and then Step S14 so that the outdoor fan 4 is stopped and the fan operation mode flag is set to "0". Thereafter, when the process in FIG. 3 is performed for the certain period, the process proceeds through Step S1, Step S2, Step S3, and then Step S4. When the ambient temperature of the capacitor 6 is then equal to or higher than Tc1, the process proceeds through Step S5, Step S6, Step S7, and then Step S8, so that the outdoor fan 4 starts rotating at the protective revolution number to enter the protective operation mode, and the measurement of the protective operation time starts. When the protective operation time thereafter becomes t1 or longer, the control unit 10 stops the outdoor fan 4.

According to the first embodiment, when the operation of the compressor 3 is stopped, the control unit 10 temporarily stops the outdoor fan 4, determines whether the ambient temperature of the capacitor 6 is less than Tc1 during a certain period, and rotates the outdoor fan 4 at the protective revolution number when the ambient temperature of the capacitor 6 becomes equal to or higher than Tc1. Thereafter, when the protective operation time becomes equal to or greater than t1, the control unit 10 stops the outdoor fan 4.

Figure 4:
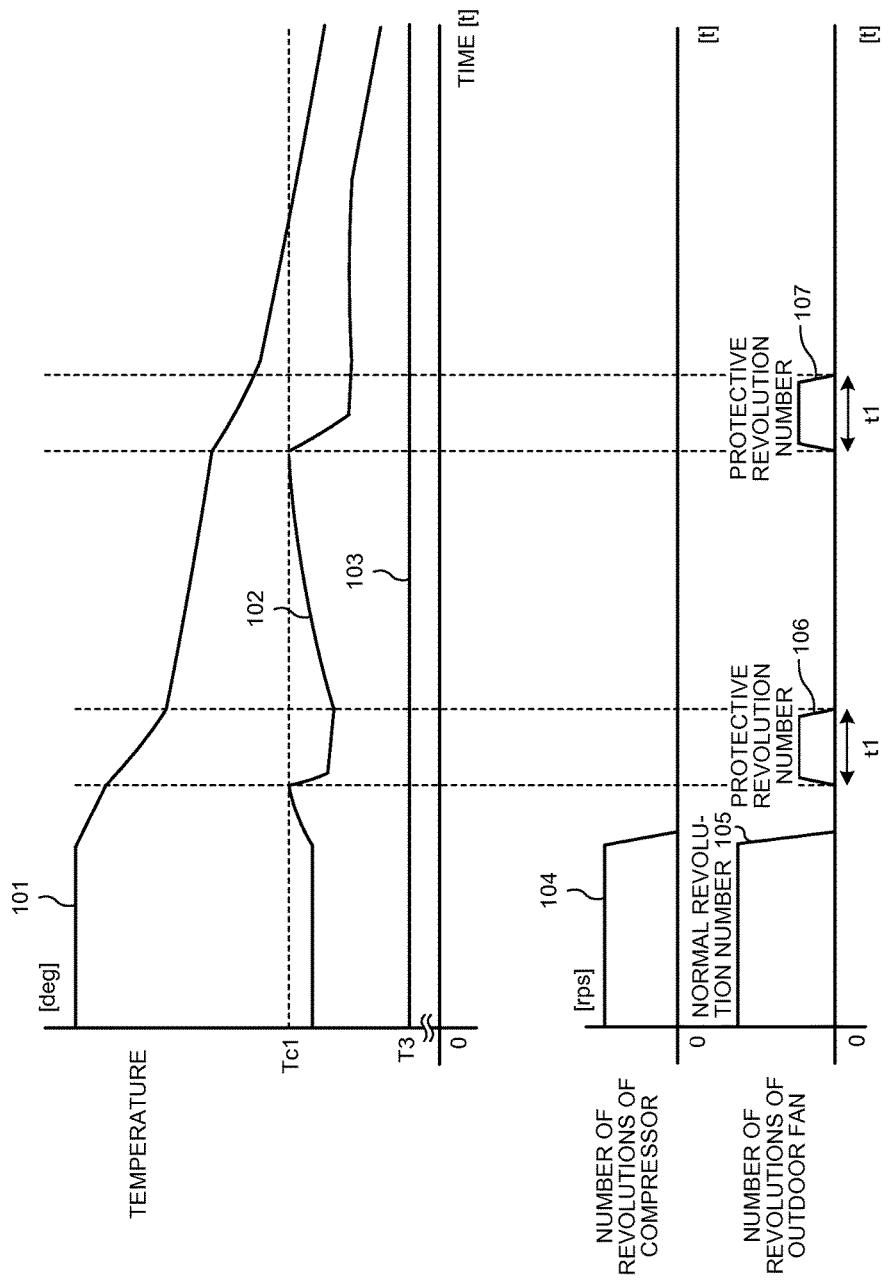
FIG. 4 is a diagram illustrating an example of change of the rotation number (rotations per second) of the outdoor fan according to the first embodiment.

FIG. 4 is a diagram illustrating an example of the change of the rotation number (rotations per second) of the outdoor fan 4 according to the first embodiment. The horizontal axis in FIG. 4 represents time; and FIG. 4 illustrates a temperature 101 of the reactor 7, a capacitor ambient temperature 102, and an outside air temperature 103 at an upper portion. FIG. 4 illustrates an example where the outside air temperature 103 is T3. FIG. 4 illustrates the number of revolutions of the compressor 3 and the number of revolutions of the outdoor fan 4 at a lower portion thereof. A revolution number 104 represents the number of revolutions of the compressor 3 in the normal operation mode; a revolution number 105 represents the normal revolution number of the outdoor fan 4, i.e., the number of revolutions of the outdoor fan 4 in the normal operation mode; and revolution numbers 106 and 107 represent the protective revolution number of the outdoor fan 4, i.e., the number of revolutions of the outdoor fan 4 in the protective operation mode.

According to the first embodiment, as illustrated in FIG. 4, when the compressor 3 stops rotating, the control unit 10 temporarily stops the outdoor fan 4 and keeps the outdoor fan 4 stopped when the capacitor ambient temperature 102 is less than Tc1. The control unit 10 rotates the outdoor fan 4 at the protective revolution number when the capacitor ambient temperature 102 rises to Tc1, and it stops the outdoor fan 4 when the protective operation time becomes t1. The control unit 10 rotates the outdoor fan 4 at the protective revolution number when the capacitor ambient temperature 102 rises to Tc1 again, and it stops the outdoor fan 4 when the protective operation time becomes t1.

The following explains, when the compressor 3 of the air conditioner according to the first embodiment stops, why the outdoor fan 4 is temporarily stopped and then it is determined whether the temperature of the capacitor 6 is lower than Tc1. When the outdoor fan 4 is operating, suction of the outdoor fan 4 permits outside air to be taken into the machine room 8 through the suction and discharge mechanism 9, and thus the capacitor 6 is cooled. Therefore, it is determined that it is unnecessary to cool the outdoor control board 5 because the temperature of the capacitor 6 is less than Tc1, and thus the outdoor fan 4 is stopped. However, the temperature of a low-heat resistant electric component in the machine room 8 of the outdoor device 2 is more likely to rise when the outdoor fan 4 is not rotating than in a case where the outdoor fan 4 is rotating. The power converter 11 includes a high-heat resistant wide-bandgap semiconductor and is provided in the outdoor device 2. The high-heat resistant reactor 7 is placed at the periphery of the outdoor control board 5. When the outdoor fan 4 is stopped, heat energy from the high-heat resistant wide-bandgap semiconductor and the reactor 7 flows to an electric component of which the heat resistance is lower than those of the wide-bandgap semiconductor and the reactor 7, thereby increasing the temperature of the low-heat resistant electric component. In recent years, the machine room 8 in the outdoor device 2 of air conditioners has been designed to have a reduced size and to have a higher density in order to save energy and space. Accordingly, heat is now more likely to remain in the machine room 8 and the temperature therein tends to rise.

Therefore, the electric components can be kept within the allowable temperature range more reliably by stopping the outdoor fan 4 and then comparing the temperature of the capacitor 6 with Tc1 than by comparing the temperature of the capacitor 6 with Tc1 while the outdoor fan 4 operating.

If it is assumed, for example, that there is a case where a power failure occurs while the compressor 3 and the outdoor fan 4 are operating or when a user trips a circuit breaker to stop the compressor 3, then when the conventional air conditioner is switched on again, the outdoor fan 4 is not operated even when the ambient temperature of the capacitor or the like is high. Therefore, the ambient temperature of the capacitor is likely to rise. But, according to the first embodiment, when the compressor 3 stops, the ambient temperature of the capacitor 6 is detected so that, when a power failure occurs or a user trips the circuit breaker and the compressor 3 is thereafter activated again, the outdoor fan 4 is activated to start cooling when the ambient temperature of the capacitor 6 is high.

Although the ambient temperature of the capacitor 6 is detected according to the first embodiment, the ambient temperature of an electric component other than the capacitor 6 provided on the outdoor control board 5 can be also detected, and when the temperature is equal to or higher than a threshold, the outdoor fan 4 can be operated in the protective operation mode.

As described above, according to the first embodiment, when the compressor 3 stops, the outdoor fan 4 is temporarily stopped; and then the outdoor fan 4 is operated for a certain time period when the temperature of the capacitor 6 is equal to or higher than Tc1. Accordingly, the outdoor fan 4 for cooling the electric components is operated for the necessary minimum to prevent the temperature rise of the electric components and thus keeping the temperature of the electric components at a temperature that is lower than the heat-resistant temperature. Therefore, power consumption can be effectively reduced.

According to the first embodiment, when the compressor 3 stops, the outdoor fan 4 is temporarily stopped, and then the outdoor fan 4 is operated for a certain time period while the temperature of the capacitor 6 is equal to or higher than Tc1. However, the operation time or the protective operation time of the outdoor fan 4 does not need to be fixed. For example, when the compressor 3 stops, it is also possible that the outdoor fan 4 is temporarily stopped, that the protective operation mode of the outdoor fan 4 may be started when the temperature of the capacitor 6 is equal to or higher than Tc1, and that the protective operation mode is maintained until the temperature of the capacitor 6 becomes equal to or lower than a continued threshold Tc2, which is lower than Tc1.

When the compressor 3 stops, the outdoor fan 4 is activated when the temperature of the electric components is high. Therefore, even when a power failure occurs or the user trips the circuit breaker and power is then recovered, a temperature rise of the electric components can be reduced, which effectively prevents both the failure of the electric components and a reduction in the life of the electric components.

Second Embodiment

Figure 5:
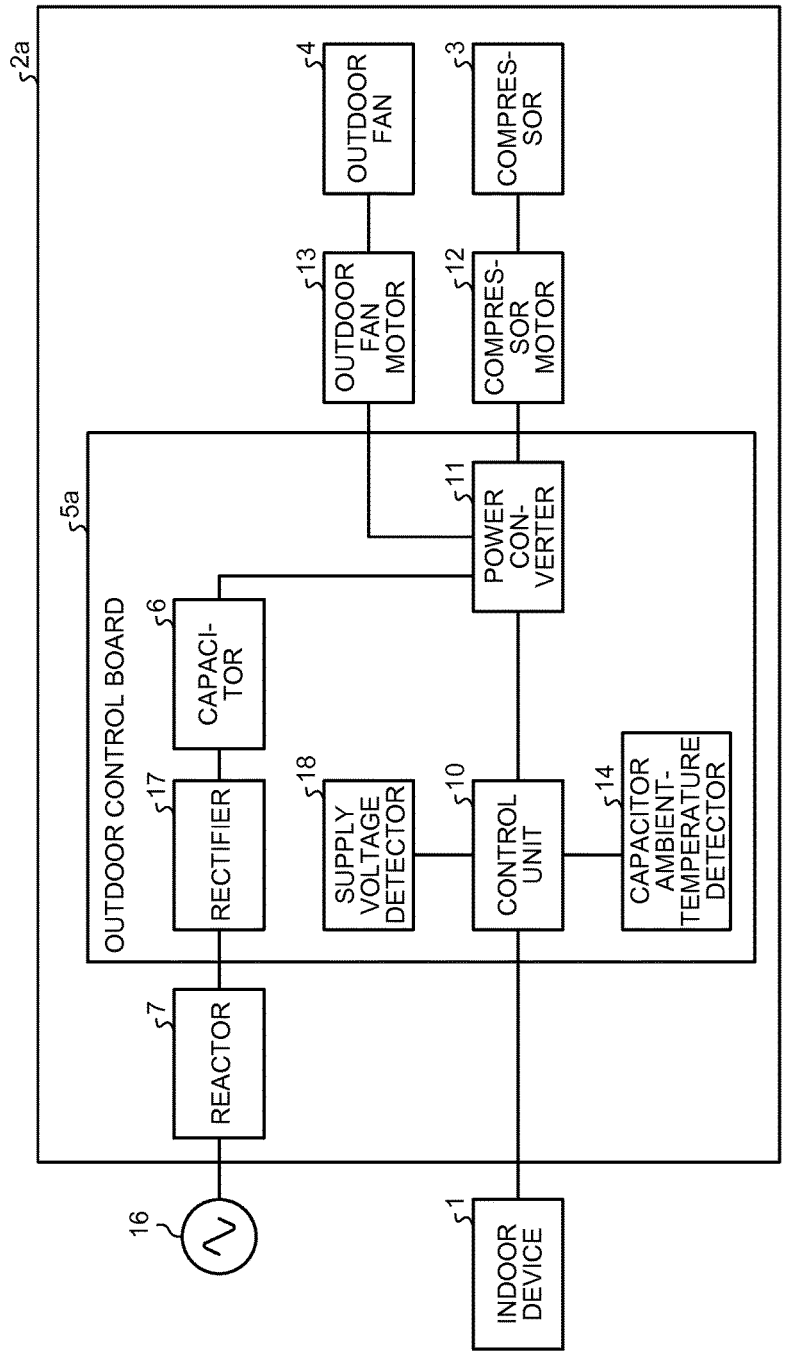
FIG. 5 is a diagram illustrating an example configuration of an air conditioner according to a second embodiment of the present invention.

FIG. 5 is a diagram illustrating an example configuration of an air conditioner according to a second embodiment of the present invention. As illustrated in FIG. 5, the air conditioner according to the second embodiment includes the indoor device 1 and an outdoor device 2a. The outdoor device 2a is identical to the outdoor device 2 according to the first embodiment except that the outdoor control board 5 according to the first embodiment is replaced with an outdoor control board 5a. The indoor device 1 and the outdoor device 2a are connected to each other with a refrigerant pipe, a power line, and a communication line. Constituent elements having functions identical to those described in the first embodiment are denoted by the same reference signs in the first embodiment and redundant descriptions thereof will be omitted. Elements different from the first embodiment are described below.

The outdoor control board 5a has a supply voltage detector 18 that detects the value of an AC voltage input from the AC power supply 16 or a supply voltage added to the outdoor control board 5 according to the first embodiment. An operation associated with the control of the outdoor fan 4 according to the second embodiment is identical to the operation according to the first embodiment. According to the second embodiment, a power-failure interruption process is further performed when a power failure occurs. Specifically, the control unit 10 monitors whether a power failure occurs or power is cut off by a user in accordance with a voltage value detected by the supply voltage detector 18, that is, it monitors whether supply of power is stopped, and it interrupts other processes so as to perform the power-failure interruption process when it determines power supply is stopped.

Figure 6:
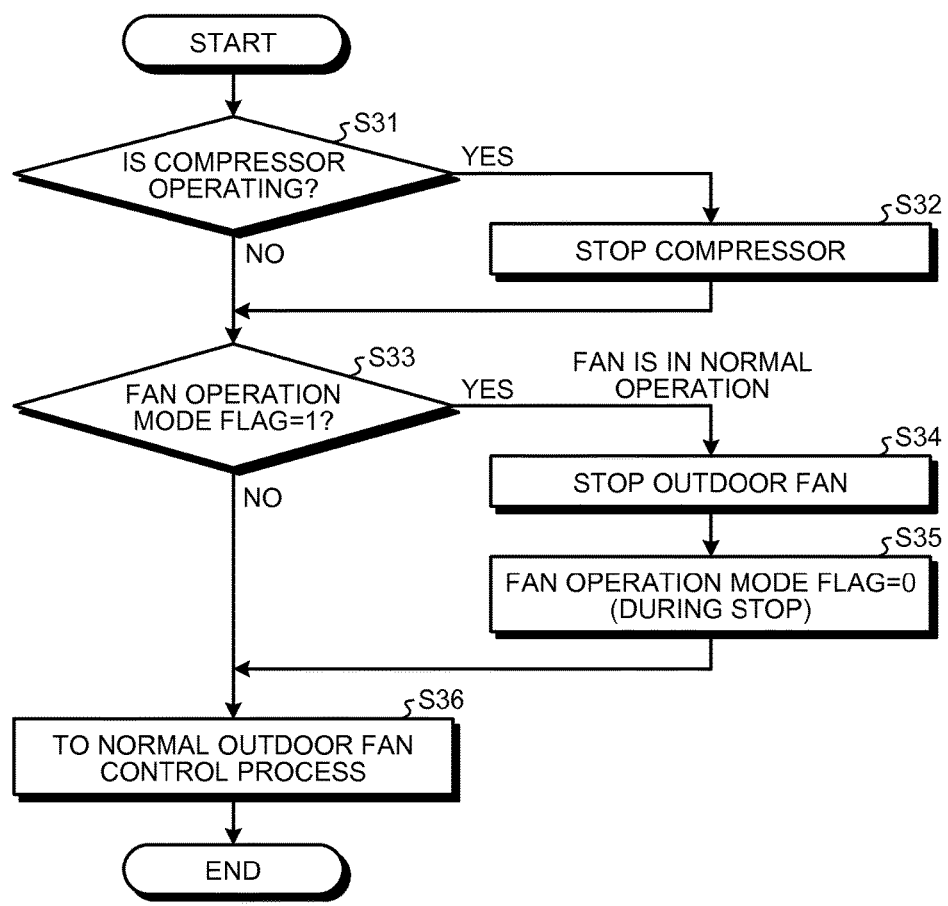
FIG. 6 is a flowchart illustrating an example of an interrupt processing procedure at a power-failure according to the second embodiment.

FIG. 6 is a flowchart illustrating an example of an interrupt processing procedure at a power-failure according to the second embodiment. The control unit 10 determines whether the compressor 3 is operating (Step S31). When the compressor 3 is not operating (NO at Step S31), the control unit 10 determines whether the fan operation mode flag is "1" (Step S33). When it is determined that the fan operation mode flag is not "1" (NO at Step S33), the control unit 10 returns to the normal control process for the outdoor fan 4, that is, the process illustrated in FIG. 3 (Step S36), and ends the power-failure interruption process. When the compressor 3 is in operation at Step S31 (YES at Step S31), the control unit 10 stops the compressor 3 (Step S32), and then proceeds to Step S33.

When it is determined at Step S33 that the fan operation mode flag is "1" (YES at Step S33), the control unit 10 stops the outdoor fan 4 (Step S34), sets the fan operation mode flag to "0" (Step S35), and then proceeds to Step S36.

As described above, according to the second embodiment, when a power failure or a power cutoff by the user occurs, the compressor 3 and the outdoor fan 4 are stopped, and then the normal control process for the outdoor fan 4 is performed. Here, described is the reason why the compressor 3 and the outdoor fan 4 are stopped when a power failure or a power cutoff by the user occurs. When a power failure or a power cutoff by the user occurs and if the compressor 3 is kept operating, the voltage smoothed by the capacitor 6 is discharged soon so that all the functions of the outdoor device 2a are stopped. In this case, the ambient temperature of the capacitor 6 may rise. Therefore, according to the second embodiment, when detecting occurrence of a power failure or a power cutoff by the user, the control unit 10 stops the compressor 3, and then performs the normal control process for the outdoor fan 4. That is, the ambient temperature of the capacitor 6 is detected by using energy remaining in the capacitor 6, and when the ambient temperature of the capacitor 6 exceeds Tc1, the outdoor fan 4 is operated to cool the outdoor control board 5a.

As described above, according to the second embodiment, when a power failure or a power cutoff by the user occurs, the compressor 3 is stopped, and then the control process for the outdoor fan 4 that has been described in the first embodiment is performed. Therefore, even when a power failure or a power cutoff by the user occurs, the outdoor fan 4 can cool the outdoor control board 5a.

Third Embodiment

Figure 7:
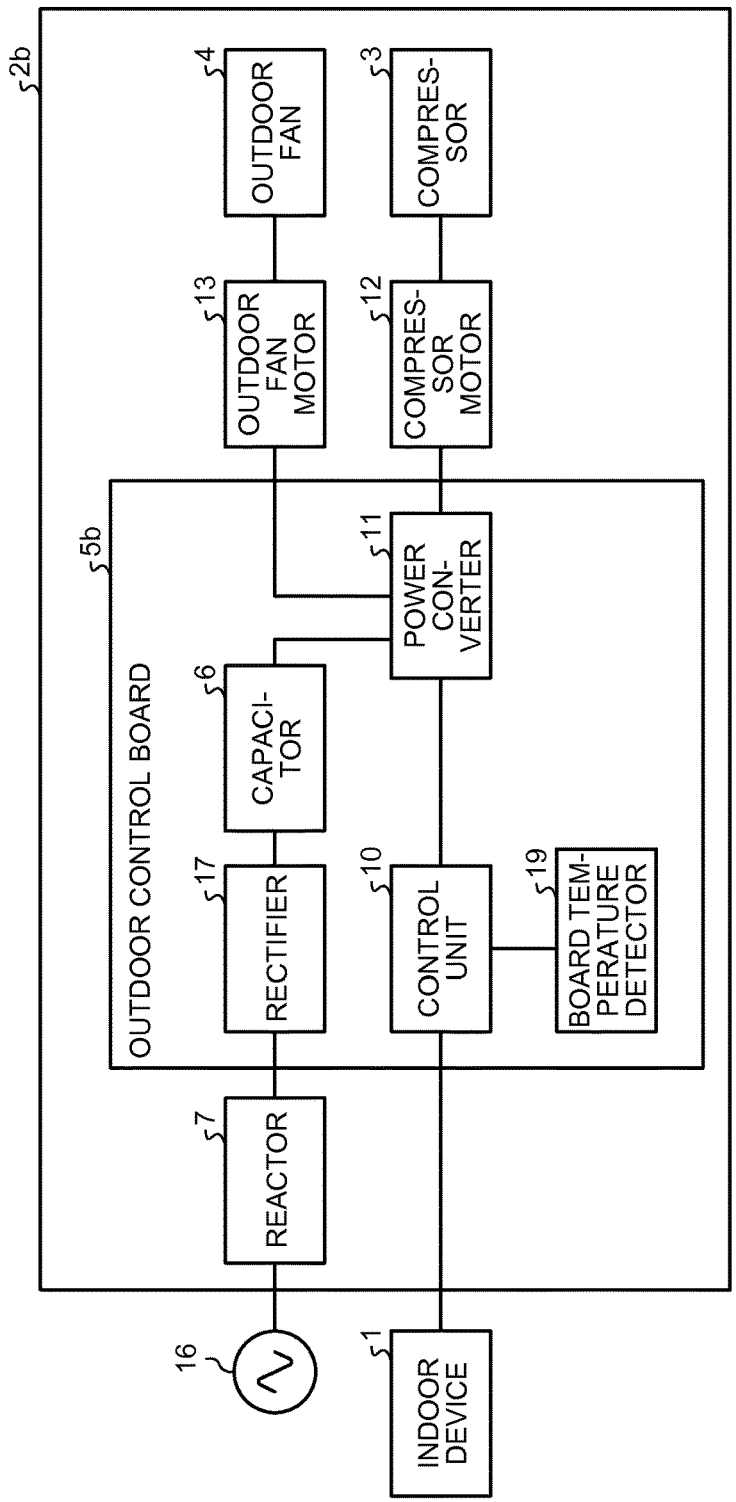
FIG. 7 is a diagram illustrating an example configuration of an air conditioner according to a third embodiment of the present invention.

FIG. 7 is a diagram illustrating an example configuration of an air conditioner according to a third embodiment of the present invention. As illustrated in FIG. 7, the air conditioner according to the third embodiment includes the indoor device 1 and an outdoor device 2b. The outdoor device 2b is identical to the outdoor device 2 according to the first embodiment except that the outdoor control board 5 according to the first embodiment is replaced with an outdoor control board 5b. The indoor device 1 and the outdoor device 2b are connected to each other via a refrigerant pipe, a power line, and a communication line. Constituent elements having functions identical to those described in the first embodiment are denoted by the same reference signs in the first embodiment and redundant descriptions thereof will be omitted. Elements different from the first embodiment are described below.

The outdoor control board 5b is identical to the outdoor control board 5 according to the first embodiment except that the outdoor control board 5b includes a board temperature detector 19 that is a temperature detector to detect the temperature of the surface of the outdoor control board 5b, in place of the capacitor ambient-temperature detector 14 according to the first embodiment.

The capacitor ambient-temperature detector 14 according to the first embodiment has a limitation on an installation location for detecting the ambient temperature of the capacitor, whereas the board temperature detector 19 can be located anywhere on the outdoor control board 5b. Therefore, according to the third embodiment, wiring can be made shorter and further cost reduction can be achieved, as compared to the case where the capacitor ambient-temperature detector 14 is provided.

Figure 8:
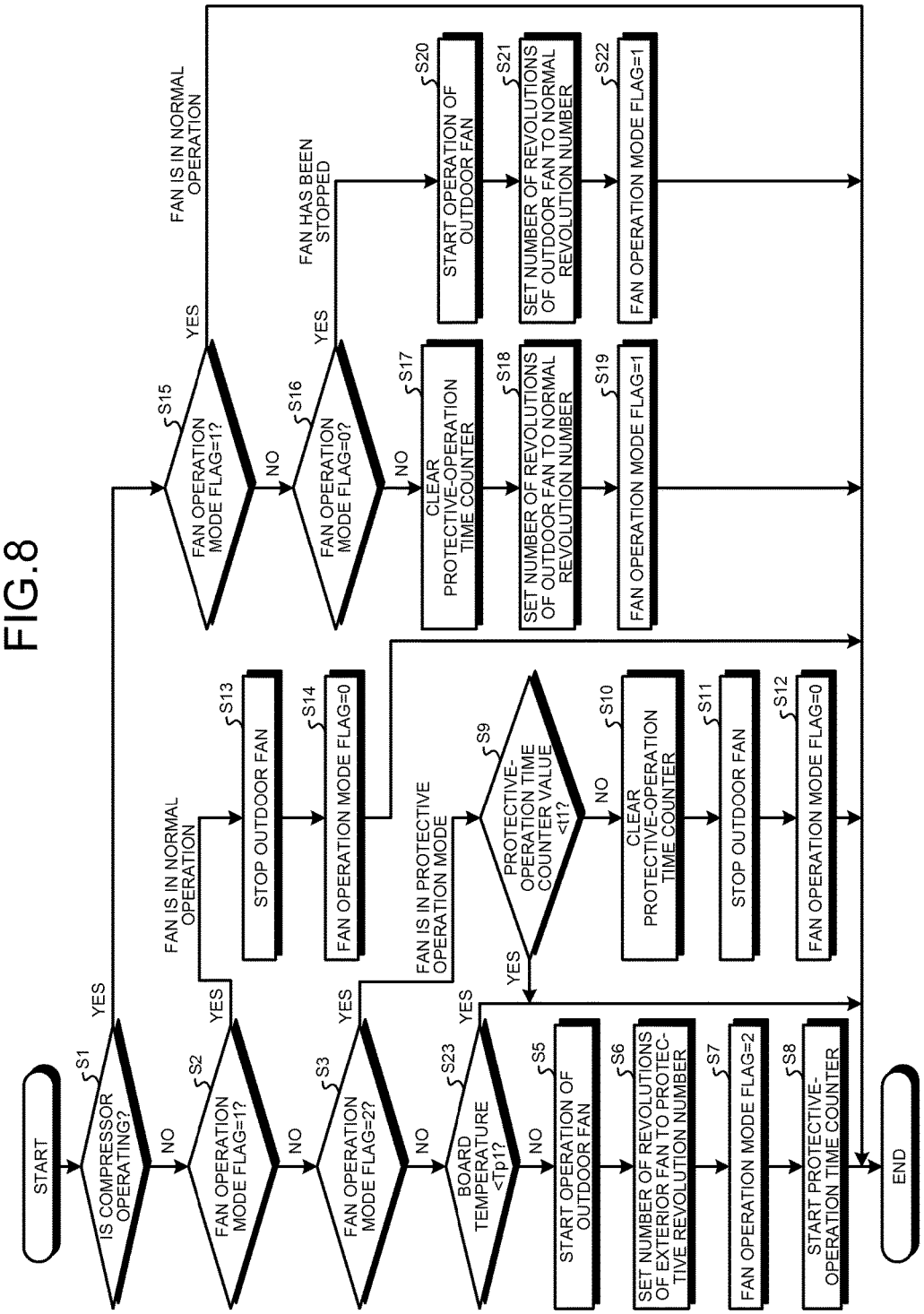
FIG. 8 is a flowchart illustrating an example of a control procedure of the air conditioner's outdoor fan according to the third embodiment.

FIG. 8 is a flowchart illustrating an example of a control procedure for the outdoor fan 4 of the air conditioner according to the third embodiment. Steps S1 to S3 and Steps S5 to S22 are identical to those of the first embodiment. According to the third embodiment, Step S23 described below is performed in place of Step S4 of the first embodiment.

At Step S23, the control unit 10 acquires a board temperature detected by the board temperature detector 19, that is, the temperature of the top surface of the outdoor control board 5b from the board temperature detector 19, and determines whether the board temperature is less than a threshold Tp1 (Step S23). When it is determined that the board temperature is less than the threshold Tp1 (YES at Step S23), the control unit 10 ends the process, and when it is determined that the board temperature is equal to or higher than the threshold Tp1 (NO at Step S23), the process proceeds to Step S5.

Although the third embodiment describes an example in which the board temperature detector 19 is provided in place of the capacitor ambient-temperature detector 14 according to the first embodiment, the board temperature detector 19 can be also used in place of the capacitor ambient-temperature detector 14 according to the second embodiment.

As described above, according to the third embodiment, the temperature of the outdoor control board 5b is detected instead of detecting the ambient temperature of the capacitor 6. Therefore, effects identical to those of the first embodiment can be achieved, and can achieve further cost reduction than that of the first embodiment.

Furthermore, according to the third embodiment, when the compressor 3 is stopped, the outdoor fan 4 is temporarily stopped, and the outdoor fan 4 is operated for a certain time period when the board temperature is equal to or higher than the threshold Tp1. However, the operation time of the outdoor fan 4, that is, the protective operation time may not be set to a certain time period. For example, when the compressor 3 is stopped, it is also possible to configure that the outdoor fan 4 is temporarily stopped, and when the board temperature is equal to or higher than the threshold Tp1, the protective operation mode of the outdoor fan 4 is started, and the board temperature is maintained until the board temperature becomes equal to or lower than a continuous threshold Tp2 that is lower than Tp1.

Fourth Embodiment

Figure 9:
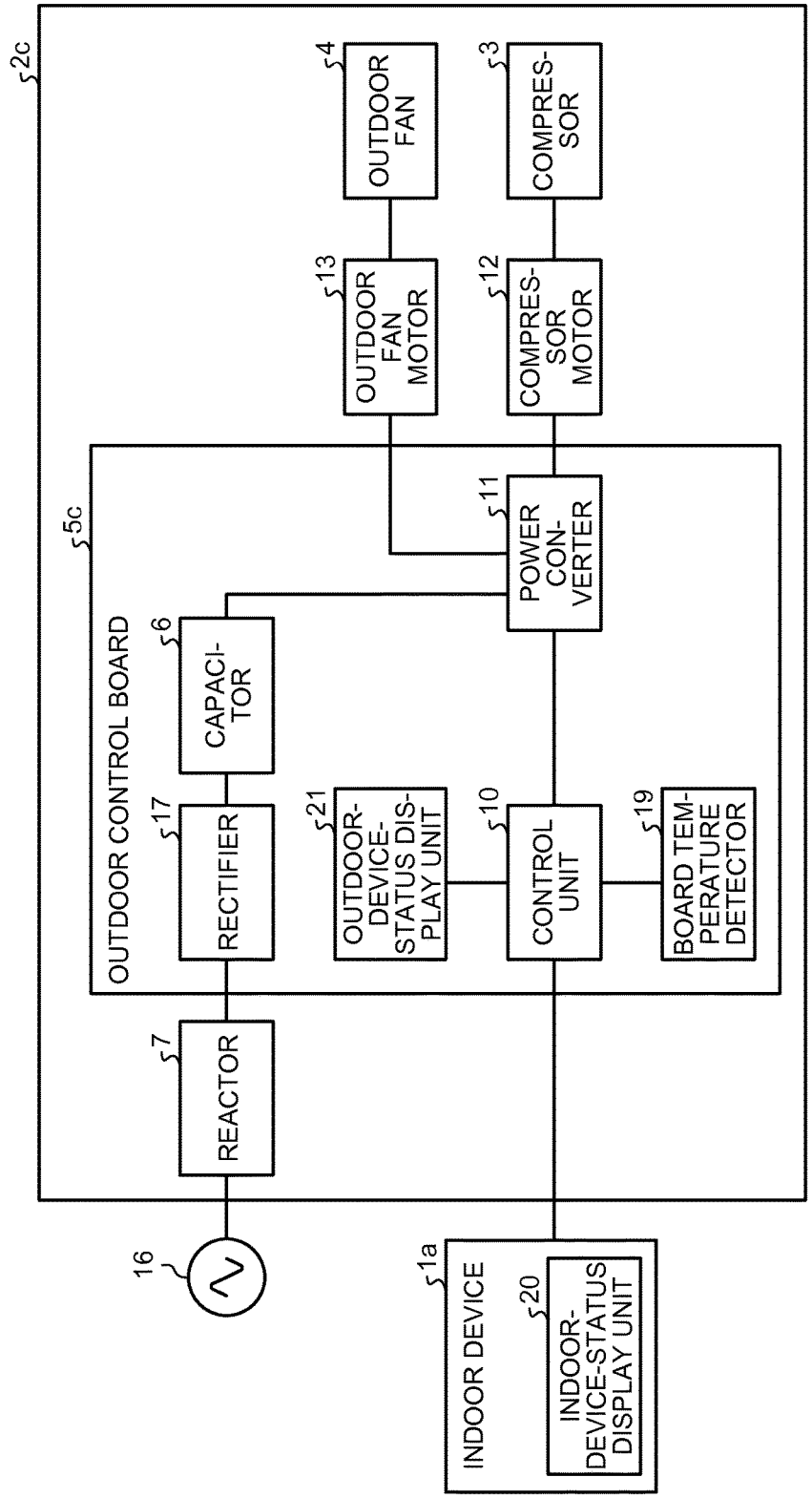
FIG. 9 is a diagram illustrating an example configuration of an air conditioner according to a fourth embodiment of the present invention.

FIG. 9 is a diagram illustrating an example configuration of an air conditioner according to a fourth embodiment of the present invention. As illustrated in FIG. 9, the air conditioner according to the fourth embodiment includes the indoor device 1a and an outdoor device 2c. The indoor device 1a is identical to the indoor device 1 according to the third embodiment except that an indoor-device-status display unit 20 that displays the status of the indoor device 1a is added thereto so as to cause a user to observe the status of the indoor device 1a. The outdoor device 2c is identical to the outdoor device 2b according to the third embodiment except that the outdoor control board 5b according to the third embodiment is replaced with an outdoor control board 5c. The outdoor control board 5c according to the fourth embodiment is identical to the outdoor control board 5b according to the third embodiment except that an outdoor-device-status display unit 21 that displays the status of the outdoor device 2c is added thereto. The indoor device 1a and the outdoor device 2c are connected to each other via a refrigerant pipe, a power line, and a communication line. Constituent elements having functions identical to those described in the first embodiment are denoted by the same reference signs in the first embodiment and redundant descriptions thereof will be omitted. Elements different from the first embodiment are described below.

Figure 10:
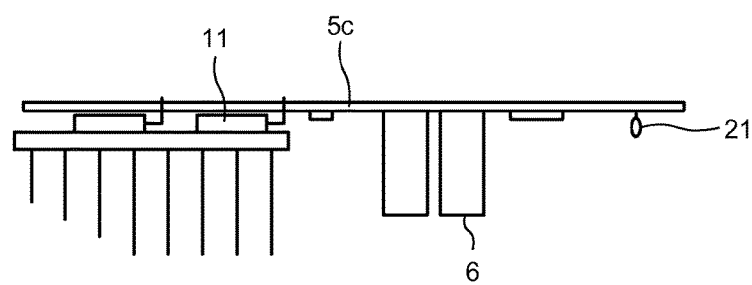
FIG. 10 is a diagram illustrating an example placement of respective constituent elements of an outdoor control board for an outdoor device according to the fourth embodiment.
Figure 11:
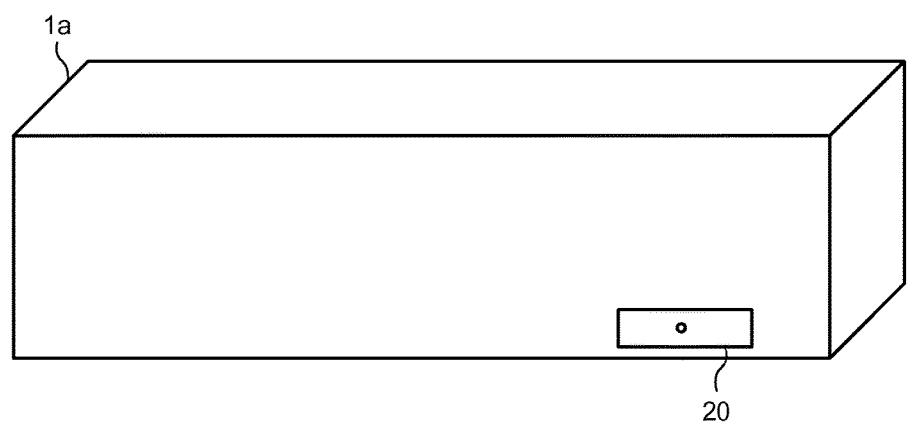
FIG. 11 is a diagram illustrating an example configuration of an indoor device according to the fourth embodiment.

FIG. 10 is a diagram illustrating an example placement of respective constituent elements of the outdoor control board 5c of the outdoor device 2c according to the fourth embodiment. FIG. 11 is a diagram illustrating an example configuration of the indoor device 1a according to the fourth embodiment.

As illustrated in FIG. 10, the outdoor-device-status display unit 21 is provided on the outdoor control board 5c. As illustrated in FIG. 11, the indoor-device-status display unit 20 is disposed at a location that is recognizable to a user of the indoor device 1a. The indoor-device-status display unit 20 may be formed of an LED (Light Emitting Diode) that indicates the status of the outdoor device 2c by the number of flickers, a display unit that indicates the status of the outdoor device 2c by a numeral or a symbol provided by an 8-segment display, or may indicate the status of the outdoor device 2c by sound. An LED or the like can be used as the outdoor-device-status display unit 21.

Next, operations of the fourth embodiment are described. A control procedure for the outdoor fan 4 of the air conditioner is identical to that of the third embodiment. According to the fourth embodiment, the control unit 10 transmits a signal representing the protective operation mode to the indoor device 1a while the protective operation mode is executed. While receiving the signal representing the protective operation mode, the indoor device 1a causes the indoor-device-status display unit 20 to indicate the protective operation mode. Further, while executing the protective operation mode, the control unit 10 instructs the outdoor-device-status display unit 21 to indicate the protective operation mode, so that the outdoor-device-status display unit 21 displays the protective operation mode in response to the instruction.

As described above, according to the fourth embodiment, during the protective operation mode, that the operation is the protective operation mode is displayed on the indoor device 1a and on the outdoor control board 5c of the air conditioner. Therefore, it is possible for a user to recognize that the outdoor fan 4 is operating after a user stops the air conditioner, thereby preventing erroneous recognition that there is an erroneous operation or a failure.

In the fourth embodiment, although the protective operation mode is displayed on both the indoor device 1a and the outdoor control board 5c, it is also possible that the display is made by one of the indoor device 1a and the outdoor control board 5c. Furthermore, the indoor-device-status display unit 20 and the outdoor-device-status display unit 21 can be added to the air conditioner according to the first embodiment or the second embodiment to display the protective operation mode.

According to the present invention, temperature rise of an electric component can be reduced while power consumption is reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An outdoor device of an air conditioner including a compressor, an outdoor fan, and an outdoor control board, the outdoor device comprising:
   a controller on the outdoor control board, the controller is configured to control the compressor and the outdoor fan; and
   a temperature detector that detects an ambient temperature of an electric component provided on the outdoor control board, wherein the ambient temperature is the temperature around the electric component inside the outdoor device, wherein
   the controller is configured to:
      determine whether the compressor is stopped,
      responsive to determining that the compressor is stopped,
         first, stop the outdoor fan and
         next, determine whether a temperature detected by the temperature detector is greater than or equal to a first threshold, the first threshold being a predetermined ambient electric component temperature to begin protective operation mode, and
      then,
         responsive to determining that the temperature detected by the temperature detector is greater than or equal to the first threshold, start to operate the outdoor fan that has been stopped at a predetermined protective RPM that is lower than a normal operation mode RPM of the outdoor fan so as to circulate air, thereby cooling the outdoor control board, and responsive to determining that the temperature detected by the temperature detector is not greater than or equal to the first threshold, maintain the outdoor fan as stopped.

2. The outdoor device according to claim 1, wherein the electric component includes a capacitor.

3. The outdoor device according to claim 1, wherein the controller is further configured to when an operation of the compressor and the outdoor fan is not started after the outdoor device is switched on, determine whether a temperature detected by the temperature detector is greater than or equal to the first threshold, and, responsive to determining that the temperature detected by the temperature detector is greater than or equal to the first threshold, operate the outdoor fan at the predetermined protective RPM so as to circulate air, thereby cooling the outdoor control board, and responsive to determining that the temperature detected by the temperature detector is not greater than or equal to the first threshold, maintain the outdoor fan as stopped.

4. The outdoor device according to claim 1, wherein the controller is further configured to responsive to a predetermined time elapsing after operation of the outdoor fan is started at the predetermined protective RPM, stop the outdoor fan and then determine whether a temperature detected by the temperature detector is greater than or equal to the first threshold, and responsive to determining that the temperature detected by the temperature detector is greater than or equal to the first threshold, operate the outdoor fan at the predetermined protective RPM, and responsive to determining that the temperature detected by the temperature detector is not greater than or equal to the threshold, maintain the outdoor fan as stopped.

5. The outdoor device according to claim 1, wherein the controller is further configured to when the controller starts operating the outdoor fan at the predetermined protective RPM, keep operating the outdoor fan at the predetermined protective RPM until a temperature detected by the temperature detector becomes less than or equal to a second threshold that is lower than the first threshold.

6. The outdoor device according to claim 1, further comprising a supply voltage detector that detects a supply voltage, wherein the controller is further configured to determine whether power supply is stopped on the basis of a supply voltage detected by the supply voltage detector, responsive to determining that the power supply is stopped, stop the compressor and the outdoor fan.

7. The outdoor device according to claim 1, further comprising an outdoor-device-status display unit that displays an operation status of the outdoor device, wherein the outdoor-device-status display unit, when the outdoor fan is in operation at the predetermined protective RPM, displays that the outdoor fan is in operation at the predetermined RPM.

8. The outdoor device according to claim 1, comprising a power converter having an element including a wide-bandgap semiconductor.

9. An air conditioner comprising:

the outdoor device according to claim 1; and an indoor device that is connected to the outdoor device.

10. The air conditioner according to claim 9, wherein the indoor device includes a display unit that displays an operation status of the outdoor device, and the display unit, when the outdoor fan is in operation at the predetermined protective RPM, displays that the outdoor fan is in operation at the predetermined protective RPM.

\* \* \* \* \*